2,801,257
Patented July 30, 1957

2,801,257

HYDROLYSIS OF CASTOR OIL

Edward Albert Lawrence, Port Washington, N. Y., and Paul Becher, Murray Hill, N. J., assignors to Colgate-Palmolive Company, Jersey City, N. J., a corporation of Delaware No Drawing. Application July 1, 1954,
Serial No. 440,844

4 Claims. (Cl. 260—415)

This invention relates to an improved process for the aqueous hydrolysis of castor oil to produce fatty acids and glycerine.

It has previously been proposed to continuously hydrolyze fats and fatty oils by dropping dispersed liquid water through a rising column of fat at sufficiently elevated temperatures for the water to be appreciably soluble in the fat, e. g. above about 200° C. The amount of water used is considerably in excess of the amount required to react with the fat, including in addition to that water necessary to reaction, an amount sufficient to saturate the fatty phase as a solute and also an amount sufficient to wash out or extract the glycerine formed as a product of the reaction. The reactants are maintained under pressure in excess of that required to condense steam at the operating temperatures, thus insuring that the water is present in the liquid phase. In the course of such operation the water hydrolyzes the fat to produce fatty acids which rise and are removed from above the top of the hydrolysis zone, which zone is hereby defined as the region between the uppermost point of water injection and the base of the column of fat. The droplets comprising the falling dispersed aqueous phase extract the glycerine and carry it downward through the column of fat and into a continuous aqueous body of liquid maintained at the base of the fatty column. The interface between the column of fat and the continuous aqueous phase is normally maintained slightly above the location at which fat enters the hydrolysis system. Dilute aqueous glycerine is removed from the continuous aqueous body and is then subjected to concentration and purification, if so desired.

With fats such as tallow, coconut oil, and the like, the operation is eminently satisfactory. However, it has now been found that under certain conditions the previously proposed process is entirely unsatisfactory for the hydrolysis of castor oil.

Castor oil apparently is unique among commercially important fats and fatty oils in that its specific gravity is unusually high, being about 0.95 at 30° C. as compared to approximately 1.0 for water and 0.88 for tallow for example. As the temperature in the hydrolysis zone is increased toward the optimum operating temperatures of about 235° C. to 260° C., the specific gravity of water decreases, becoming about 0.79 at 250° C. The specific gravity of castor oil also diminishes with increasing temperature, but not as rapidly as in the case of water, the net result being that at the temperatures most desirable for use in its hydrolysis, castor oil is no longer gravitationally displaced by water. This situation has now been found to manifest itself in the formation of an emulsion within the hydrolysis zone when it is attempted to continuously hydrolyze castor oil under the conditions normally employed by the previously proposed process when operating at temperatures above about 235° C.

In accordance with the present invention an eminently satisfactory process for hydrolysis of castor oil comprises intimately contacting castor oil with an amount of water substantially in excess of the amount required to hydrolyze the castor oil while maintaining a system of two liquid phases consisting of an aqueous phase dispersed throughout and flowing countercurrently to a fatty phase at a temperature above about 235° C. and a pressure substantially above the saturation pressure of steam at the highest temperature employed, said water being used in amounts sufficient to supply that required for hydrolysis, that dissolved in the fatty material, and that required to wash out and remove by countercurrent flow the glycerine from the fatty material as aqueous glycerine, and supplying the aqueous phase of said two phase system with glycerine in excess of that glycerine being liberated as a hydrolysis product of said castor oil, said excess glycerine being introduced in an amount sufficient to increase the specific gravity of the aqueous phase to a specific gravity greater than that of the fatty phase, whereby the fatty phase is displaced upwardly and the aqueous phase settles so as to permit withdrawing castor oil fatty acids which have been displaced to the top and an aqueous solution of glycerine which has settled to the bottom of said two phase system. Although the present process will normally be carried out in such a manner that all the water employed therein will enter the hydrolysis zone independently of the castor oil and flow countercurrently thereto, it is within the scope of the present invention to intimately mix castor oil with a portion of the water to be utilized and to introduce such a mixture to the base of a hydrolysis zone wherein an amount of water at least sufficient to extract or wash out and remove the glycerine as aqueous glycerine flows countercurrently to such castor oil.

In the process of the present invention, the introduction of glycerine into the hydrolysis zone in an amount sufficient to increase the specific gravity of the aqueous phase to a value greater than that of the fatty phase in contact therewith causes the aqueous phase to gravitationally displace the fatty phase and flow downwardly in the hydrolysis zone while the fatty phase flows countercurrently upwards, thus avoiding a condition wherein the contents of the hydrolysis zone are so emulsified as to completely prevent continuous operation of the system.

The glycerine may be injected into the hydrolysis zone at the top thereof with the water entering at that point or at any level above the base of the hydrolysis zone. However it is preferred to introduce the glycerine below the midpoint of the said zone because the presence of glycerine, a product of the hydrolysis reaction, in contact with fatty material tends to diminish the driving force causing the hydrolysis to occur. This factor normally is of small consequence in the lower portion of the hydrolysis zone wherein a major portion of the castor oil is hydrolyzed, however it is desirable to have relatively pure water in contact with the fatty material leaving the top of the hydrolysis zone in order to minimize the amount of glycerine in the effluent fatty phase. Furthermore, it is frequently desirable to heat the contents of the hydrolysis zone by the introduction of steam through spargers dispersed throughout its length. Such steam, introduced through the spargers, is generally at a temperature about 10° C. to 30° C. above the operating temperature in the hydrolysis zone and is under a pressure which is 50 to 100 pounds per square inch above that necessary to maintain the liquid condition of the water in the column. Since a substantial amount of the water supplied to the hydrolysis zone may enter as heating steam and since the water in the system flows downwards, the ratio of water to oil is a maximum in the region below the lowest steam sparger, and it is in this region that the injected glycerine is most effective in preventing emulsification while at the same time having a relatively slight effect on the yield of fatty acids achieved.

The amount of glycerine which must be injected is that amount sufficient to increase the specific gravity of the aqueous phase to a value greater than that of the fatty phase in contact therewith, that is it must be sufficient such that throughout the vertical length of the hydrolysis zone, the aqueous phase gravitationally displaces the fatty phase it contacts. The specific rate of injection of glycerine will depend upon the particular operating conditions involved, particularly the water to oil ratio. Normally however, it is sufficient to inject excess glycerine at a rate such that the aqueous phase at the base of the hydrolysis zone comprises about 25% or more glycerine. Thus, while it is obvious that any aqueous glycerine solution of sufficient glycerine content may be utilized, it is preferable to employ concentrated glycerine unless it is desirable to supply a part of the water necessary to the hydrolysis process along with the injected excess glycerine.

It is essential to the operation of the present invention that sufficient water be supplied to the hydrolysis zone to maintain a system of two liquid phases therein. Thus the amount of water present in the hydrolysis zone must be at least sufficient to supply that required for hydrolysis, that which dissolves in the fatty material, and that required to extract or wash out and remove the glycerine from the fatty phase as aqueous glycerine, e. g. at least about 0.3 part by weight of water for each part of castor oil. If desired, a large excess of water may be employed, however such action tends to lower the specific gravity of the aqueous phase and thereby compel the introduction of an unnecessarily large amount of excess glycerine. On the other hand, use of a minimum excess of water is desirable in that it produces an aqueous glycerine solution of relatively high concentration and specific gravity. As referred to previously, the water may enter the hydrolysis zone entirely as liquid water, or partly as heating steam as long as the conditions of temperature and pressure within that zone are such as to maintain the water therein in the liquid form.

The operating temperature of the present process is above about 235° C. since it is only at such temperatures that essentially complete hydrolysis of castor oil readily occurs and also that serious difficulty with emulsification is encountered within the hydrolysis zone. The advantages of operation at such elevated temperatures are illustrated by the data in the following table:

Table I

| Temperature Hydrolysis Zone, °C. | Rate of Flow Castor Oil, Pounds per Hour | Rate of Flow, Injected Glycerine, Pounds per Hour | Combined Glycerine in Fatty Acid Output, Percent by Weight | Yield of Fatty Acid,[1] percent by Weight |
|---|---|---|---|---|
| 230 | 140 | 0 | 1.17 | 94 |
| 234 | 111 | 9.5 | 0.17 | 99 |
| 236 | 102 | 13.5 | 1.14 | 04 |
| 243 | 140 | 15.0 | 0.97 | 95 |
| 245 | 102 | 13.5 | Nil | 100 |

[1] This term is calculated by considering as 100% the total fatty acid content of the fatty acid output and subtracting therefrom the percentage of the fatty acid capable of being esterified as equal parts of mono- and diglycerides by the combined glycerine in the said fatty acid output The data of Table I are obtained in a vertically elongated column under operating conditions such that the weight ratio of liquid water pumped to the top of the column to castor oil is 0.4. Heat is furnished to the system and the temperature of the hydrolysis zone is adjusted to the values of Table I by controlling the flow of steam to spargers located near the ends of the hydrolysis zone. Thus heating steam is supplied to a sparger located near the top of the column at a weight rate of flow approximately 0.1 that of the castor oil, and similarly steam is supplied to a sparger located slightly above the base of the hydrolysis zone at a rate of flow approximately 0.2 that of the castor oil. Added to the castor oil entering the column is 0.1% by weight of zinc oxide catalyst, however the use of a catalyst in the process of the present invention is entirely optional. On attempting to operate at temperatures above about 235° C., emulsions are encountered unless glycerine is injected into the hydrolysis zone. The glycerine is injected at a level approximately one-third the length of the hydrolysis zone above the point of entry of pre-heated castor oil. Thus the data of Table I illustrate that castor oil may be successfully completely hydrolyzed at temperatures above 235° C. according to the present process.

The upper operating temperature limit of the present process is that at which castor oil or the fatty acids derived therefrom are adversely affected by heat, or at which the aqueous and fatty materials become so mutually soluble that the separate phases disappear. Thus the present process will normally be operated at a temperature within the range extending from about 235° C. to about 260° C.

The pressure at which the present process is operated is not critical so long as it is substantially above the saturation pressure of steam at the highest temperature employed. Since the present process is normally operated within the range of about 235° C. to about 260° C., the hydrolysis zone is normally under a pressure of from about 500 to 800 pounds per square inch respectively.

Although the present invention has been described with reference to particular embodiments and examples, it will be apparent to those skilled in the art that variations and modifications of this invention can be made and that equivalents can be substituted therefor without departing from the principles and true spirit of the invention.

Having thus described the invention, what is claimed is:

1. A process for hydrolysis of castor oil comprising intimately contacting castor oil with an amount of water substantially in excess of the amount required to hydrolyze the castor oil while maintaining a system of two liquid phases consisting of an aqueous phase dispersed throughout and flowing countercurrently to a fatty phase at a temperature above about 235° C. and a pressure substantially above the saturation pressure of steam at the highest temperature employed, said water being used in amounts sufficient to supply that required for hydrolysis, that dissolved in the fatty material, and that required to wash out and remove by countercurrent flow the glycerine from the fatty material as aqueous glycerine, and supplying the aqueous phase of said two phase system with glycerine in excess of that glycerine being liberated as a hydrolysis product of said castor oil, said excess glycerine being introduced in an amount sufficient to increase the specific gravity of the aqueous phase to a specific gravity greater than that of the fatty phase, whereby the fatty phase is displaced upwardly and the aqueous phase settles so as to permit withdrawing castor oil fatty acids which have been displaced to the top and an aqueous solution of glycerine which has settled to the bottom of said two phase system.

2. A process for hydrolysis of castor oil comprising intimately contacting by countercurrent flow castor oil with an amount of water substantially in excess of the amount required to hydrolyze the castor oil, while maintaining a system of two liquid phases consisting of an aqueous phase dispersed throughout a fatty phase at a temperature above about 235° C. and a pressure substantially above the saturation pressure of steam at the highest temperature employed, said water being used in amounts sufficient to supply that required for hydrolysis, that dissolved in the fatty material, and that required to wash out and remove the glycerine from the fatty material as aqueous glycerine, and supplying the aqueous phase of said two phase system with glycerine in excess of that glycerine being liberated as a hydrolysis product of said castor oil, said excess glycerine being introduced in an amount sufficient to increase the specific gravity of the aqueous phase to a specific gravity greater than that of the fatty phase, whereby the fatty phase is displaced upwardly and the aqueous phase settles so as to permit withdrawing castor oil fatty acids which have been displaced to the top and an aqueous solution of glycerine which has settled to the bottom of said two phase system.

3. A process for hydrolysis of castor oil comprising mixing castor oil with water in amounts sufficient to supply that required for hydrolysis and that soluble in the fatty material, then intimately contacting said mixture by countercurrent flow with an amount of water sufficient to wash out and remove the glycerine from the fatty material as aqueous glycerine while maintaining a system of two liquid phases at a temperature above about 235° C. and a pressure substantially above saturation pressure of steam at the highest temperature employed, introducing into said two-phase system glycerine in excess of that glycerine being liberated as a hydrolysis product of said castor oil, said excess glycerine being introduced in an amount sufficient to increase the specific gravity of the aqueous phase to a specific gravity greater than that of the fatty phase in contact therewith, and withdrawing castor oil fatty acids which have been displaced to the top and an aqueous solution of glycerine which has settled to the base of said two-phase system.

4. A continuous process for hydrolysis of castor oil comprising introducing castor oil to the base and water to the top of a hydrolysis zone, intimately contacting said castor oil and water by countercurrent flow while maintaining a system of two liquid phases at a temperature within the range of about 235° C. to 260° C. and a pressure substantially above the pressure above the pressure of saturated steam at the highest temperature employed, the weight ratio of said introduced water to castor oil being about 0.3 or greater, and introducing glycerine into said hydrolysis zone at a rate such that the aqueous phase at the base of said hydrolysis zone comprises about 25% or more glycerine and has a specific gravity sufficiently greater than the castor oil introduced to displace the same upwards, and withdrawing fatty acids from the top of said hydrolysis zone and withdrawing aqueous glycerine from the bottom of said hydrolysis zone.

References Cited in the file of this patent

UNITED STATES PATENTS

| | | |
|---|---|---|
| 2,221,799 | Ittner | Nov. 19, 1940 |
| 2,387,884 | Daniels | Oct. 30, 1945 |

FOREIGN PATENTS

| | | |
|---|---|---|
| 666,785 | Great Britain | Feb. 20, 1952 |